US006560195B1

(12) United States Patent
Basak et al.

(10) Patent No.: US 6,560,195 B1
(45) Date of Patent: May 6, 2003

(54) METHOD AND APPARATUS FOR LEAKY BUCKET BASED OUT-BOUND SHAPING IN AN ATM SCHEDULER

(75) Inventors: Debashis Basak, Allison Park, PA (US); Jay P. Adams, Grove City, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/140,923

(22) Filed: Aug. 27, 1998

(51) Int. Cl.$^7$ .......................... H04L 12/26; H04L 12/56
(52) U.S. Cl. ..................................... 370/230; 370/395.4
(58) Field of Search ......................... 370/395.4, 395.41, 370/395.42, 395.43, 230, 230.1, 231, 232, 233, 234, 235, 335.1, 252–254

(56) References Cited

U.S. PATENT DOCUMENTS

| | | | | |
|---|---|---|---|---|
| 5,533,020 A | * | 7/1996 | Byrn et al. | 370/395.4 |
| 5,831,971 A | * | 11/1998 | Bonomi et al. | 370/230 |
| 5,982,749 A | * | 11/1999 | Daniel et al. | 370/233 |
| 6,011,775 A | * | 1/2000 | Bonomi et al. | 370/230 |
| 6,247,061 B1 | * | 6/2001 | Douceur et al. | 370/230 |
| 6,266,327 B1 | * | 7/2001 | Hernandez-Valencia | 370/230 |

OTHER PUBLICATIONS

S. Jamaloddin Golestani, "A Self–Clocked Fair Queueing Scheme for Broadbend Applications," Infocom 94, p. 636–646, Jun. 1994.

Leonidas Georgiadis, Roch Guerin, Vinod Peris, Kumar N. Sivarajan, "Efficient Network QoS Provisioning Based on per Node Traffic Shaping," IEEE/ACM Transactions on Networking, vol. 4 (No. 4), p. 482–501, Aug. 1996.

Jennifer Rexford, Flavio Bonomi, Albert Greenberg, Albert Wong, "A Scalable Architecture for Fair Leaky–Bucket Shaping," Infocom 97, p. 1054–1062, Apr. 1997.

Abhay Kumar J. Parekh, "A Generalized Processor Sharing Approach to Flow Control In Integrated Services Networks," PhD Thesis, Massachusetts Institute of Technology, 1992.

* cited by examiner

Primary Examiner—Steven Nguyen
(74) Attorney, Agent, or Firm—Ansel M. Schwartz

(57) ABSTRACT

A scheduling apparatus includes a server for providing service to entities. The apparatus includes a mechanism for determining whether an entity that is to receive service at a future time from the server will be in conformance with a predetermined criteria at the future time when the entity is to receive service from the server. The apparatus includes a scheduler mechanism for scheduling when entities are to receive service from the server unless the determining mechanism determines the entity is not in conformance. A method for scheduling entities in an ATM network. The method includes the steps of receiving a session of an entity in a memory of an ATM switch connected to the ATM network. Then there is the step of scheduling the session for service by a server of the ATM switch. Next there is the step of determining with a determining mechanism whether the session will be conforming in terms of compliance to traffic contract of the ATM network in the future. Next there is the step of deleting the session if the session will not be conforming in the future.

25 Claims, 5 Drawing Sheets

TAT: THEORETICAL ARRIVAL TIME
t: TIME OF ARRIVAL OF A CELL

AT TIME OF ARRIVAL OF FIRST CELL ON CONNECTION, TAT = t

LINKED LIST OF CONNECTIONS
WITH ERT = t

METHOD AND APPARATUS FOR LEAKY BUCKET BASED OUT-BOUND SHAPING IN AN ATM SCHEDULER

FIELD OF THE INVENTION

The present invention is related to a scheduling apparatus and method for scheduling when an entity is to receive service from a server unless the entity will not be in conformance with a predetermined criteria. More specifically, the present invention is related to a scheduling apparatus and method for scheduling when an entity is to receive service from a server unless a session of the entity will not be in conformance with a predetermined criteria based on leaky bucket accounting, in which case the session is stored in a revival queue.

BACKGROUND OF THE INVENTION

Emerging broadband networks introduce new challenges in designing high-speed shaper architectures that can scale to a large number of connections with diverse traffic parameters. Many new networking applications, such as large scale web and video servers, require traffic shaping for hundreds or even thousands of connections with different burst and bandwidth descriptors. ATM switches can also amortize implementation costs across multiple end systems by providing traffic shaping at the network edge. In addition to shaping at the network end points, available bit-rate connections require traffic enforcement in the interior of the network at each virtual source node, where a connection's bandwidth allocation may change over time in response to feedback from the network. Variable-bit rate and constant-bit-rate connections may also be reshaped in the interior of the network to limit delay variation and buffer requirements at the downstream switches. Reinforcing the traffic parameters is particularly important when connection traverse switches with different performance characteristics or service providers.

Most existing traffic shapers employ some version of leaky bucket control to buffer non-conforming cells and schedule for later transmission. Conceptually, a leaky bucket control generates tokens at rate $\rho$, where the token holds at most $\sigma$ credits; an arriving cell must claim a token before receiving service. Given the status of the token bucket for each connection, the shaper can determine whether an arriving cell is conforming or not.

Traditionally, leaky bucket based traffic policing algorithms have been used at the ingress of a network or network component to ensure that incoming traffic is within negotiated contract. Similarly, leaky bucket based shaping algorithms have been used at the source or edge of networks to ensure injected traffic is conforming. It has been demonstrated [L. Georgiadis, R. Geurin, V. Peris, and K. N. Sivarajan. Efficient network qos provisioning based on per node traffic shaping. *IEEE/ACM Trans. Networking*, 4(4) :482–501 August 1996, incorporated by reference herein] that conforming traffic entering at the ingress of a network element such as a router or switch, can become non-conforming due to burstiness introduced by buffering and multiplexing with other sessions. Such traffic may be treated as non-conforming at the next router or switch and dropped/tagged, leading to unexpected end-to-end behavior.

Rate based schedulers [J. C. R. Bennett and H. Zhang. Wf²q: Worst-case fair weighted weighted fair queueing. In *INFOCOM'96*, pages 120–128, March 1996; S. Golestani. A self-clocked fair queueing scheme for broadband applications. In *INFOCOM'94*, pages 636–646, June 1994, incorporated by reference herein] ensure sessions obtain their minimum guaranteed rate. Bandwidth left-over from meeting such guarantees is divided based on some predefined fairness policy among sessions. Thus, although scheduling ensures a minimum to meet guarantee of a session, it does not limit the maximum bandwidth a session may receive while sharing the left-over bandwidth. Thus, its possible for a session to be served out in bursts, violating maximum burst size contract at next network element. FIG. 1 depicts a block-level diagram of an outgoing link, incoming links feeding to the outgoing link, buffer to store the incoming cells, and a scheduler to serve out cells from the buffer to the outgoing link.

Further, it has been demonstrated that buffering and scheduling decisions within a networking equipment can lead to traffic becoming more bursty at egress than it was at ingress. The egress traffic on any connection is required to be in compliance with its traffic contract. Non-conforming egress traffic entering another switch or network may be policed leading to it being tagged or dropped. The present invention includes a leaky-bucket based shaping to ensure conforming traffic at egress. Such out-bound shaping is important to keep within traffic contract specifications like PR, SCR, and ACR.

SUMMARY OF THE INVENTION

The present invention pertains to a scheduling apparatus. The apparatus comprises a server for providing service to entities. The apparatus comprises a mechanism for determining whether an entity that is to receive service at a future time from the server will be in conformance with a predetermined criteria at the future time when the entity is to receive service from the server. The apparatus comprises a scheduler mechanism for scheduling when entities are to receive service from the server unless the determining mechanism determines the entity is not in conformance.

The present invention pertains to a method for scheduling entities in an ATM network. The method comprises the steps of receiving a session of an entity in a memory of an ATM switch connected to the ATM network. Then there is the step of scheduling the session for service by a server of the ATM switch. Next there is the step of determining with a determining mechanism whether the session will be conforming in terms of compliance to traffic contract of the ATM network in the future. Next there is the step of deleting the session if the session will not be conforming in the future.

BRIEF DESCRIPTION OF THE DRAWINGS

In the accompanying drawings, the preferred embodiment of the invention and preferred methods of practicing the invention are illustrated in which.

DETAILED DESCRIPTION

Figure 8:
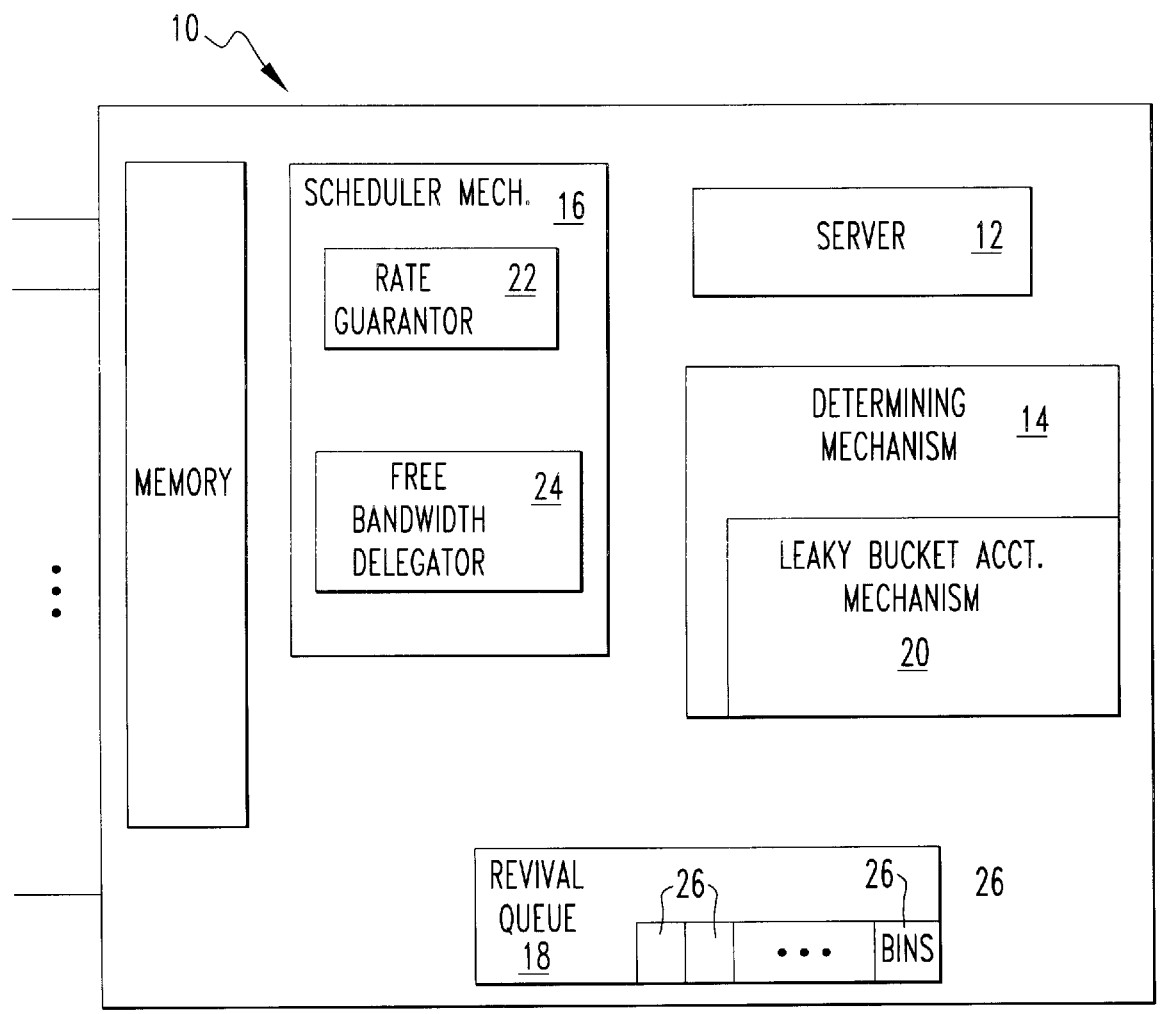
FIG. 8 is a schematic representation of an apparatus of the present invention.

Referring now to the drawings wherein like reference numerals refer to similar or identical parts throughout the several views, and more specifically to FIG. 8 thereof, there is shown a scheduling apparatus 10. The apparatus 10 comprises a server 12 for providing service to entities. The apparatus 10 comprises a mechanism 14 for determining whether an entity that is to receive service at a future time from the server 12 will be in conformance with a predetermined criteria at the future time when the entity is to receive service from the server 12. The apparatus 10 comprises a scheduler mechanism 16 for scheduling when entities are to receive service from the server 12 unless the determining mechanism 14 determines the entity is not in conformance.

Preferably, an entity includes a session, and wherein the scheduler mechanism 16 schedules the session, and the determining mechanism 14 determines whether the session will continue to be in conformance in the future. The determining mechanism 14 preferably deletes the session from the scheduler if the session in the future does not conform. The determining mechanism 14 preferably includes a leaky bucket accounting mechanism 20 which uses leaky bucket accounting to determine if a session is to continue receiving service from the server 12 by being in conformance.

Preferably, the apparatus 10 includes a revival queue 18 in which the determining mechanism 14 stores the session if it is not in conformance until a later time when the session will be in conformance and can receive service from the server 12. Preferably, the revival queue 18 returns the session earlier deleted from the scheduler mechanism 16 back to the scheduler mechanism 16 at the later time when the session will be in conformance.

The scheduler mechanism 16 preferably is a rate band width scheduler. Preferably, the scheduler mechanism 16 and the revival queue 18 and the leaky bucket accounting mechanism 20 together accomplish out-bound shaping.

The scheduler mechanism 16 preferably includes a rate guarantor 22 which schedules a guaranteed service to sessions guaranteed service. Preferably, the rate base scheduler mechanism 16 includes a free band width delegator 24 which delegates free bandwidth available for service after the rate guarantor 22 provides service to any session guaranteed sessions. The leaky bucket accounting mechanism 20 preferably is connected only with the free band width delegator 24 and the revival queue 18 is only connected with the free band width delegator 24.

The revival queue 18 preferably has bins 26 in which sessions are stored corresponding to revival times, and wherein a session deleted from the free band width delegator 24 of the scheduler mechanism 16 by the leaky bucket accounting mechanism 20 is inserted by the leaky bucket accounting mechanism 20 into the bin of the revival queue 18 corresponding to the session's earliest revival time. Preferably, the revival queue 18 returns sessions back to the free band width delegator 24 whose revival time equals the scheduler mechanism's cycle time t. The sessions preferably are of type C1, C2 or C3, where C1 sessions are only in the rate guarantor 22, C2 sessions are in both the rate guarantor 22 and free band width delegator 24 and C3 sessions are only in the free band width delegator 24. Preferably, the rate guarantor 22 has a service rate which matches the contract traffic rate. Preferably, each session has at least one set of parameters associated with it, each set of parameters has three entries comprised of TAT, I and L.

The present invention pertains to a method for scheduling entities in an ATM network. The method comprises the steps of receiving a session of an entity in a memory of an ATM switch connected to the ATM network. Then there is the step of scheduling the session for service by a server 12 of the ATM switch. Next there is the step of determining with a determining mechanism 14 whether the session will be conforming in terms of compliance to traffic contract of the ATM network in the future. Next there is the step of deleting the session if the session will not be conforming in the future.

Preferably, after the deleting step there is the step of inserting the deleted session back into the scheduler mechanism 16 at a later time when the deleted session will be conforming. Before the scheduling step there is preferably the step of serving the session with the server 12, and the determining step includes the step of determining whether the session will be conforming in the future so the session can continue to receive service from the server 12.

Preferably, after the deleting step there is the step of placing the deleted session in a revival queue 18. After the placing step there is preferably the step of sending the session from the revival queue 18 back to the scheduler mechanism 16. Preferably, the receiving step includes the step of receiving the session at a free bandwidth delegator 24 of the scheduler mechanism 16.

The deleting step preferably includes the step of deleting the session only from the free bandwidth delegator 24. Preferably, the serving step includes the step of serving a cell of the session at cycle time t. The determining step includes the steps of updating a leaky bucket parameter TAT of a leaky bucket accounting mechanism 20 of the determining mechanism 14 to reflect the current state of the leaky bucket accounting mechanism 20, and checking if the leaky bucket accounting mechanism 20 state will allow another cell of the session to be served by the server 12 in cycle time t plus 1.

Preferably, the deleting step includes the step of deleting the cell if the leaky bucket accounting mechanism 20 state will not allow the other cell to be served by the server 12 in cycle time t plus 1. The session is preferably of type C2 and after the checking step there are the steps of identifying that the other cell can be served by the server 12 in cycle time t plus 1, and checking if the leaky bucket accounting mechanism 20 state will allow a third cell of the session to be served by the server 12 in cycle time t plus 2.

In the operation of the present invention, to cancel the impact of the perturbation caused by network buffering/scheduling, it is recommended to shape the traffic at intermediate points in the network. This can be done at the egress of a networking element like an switch. The idea is to couple leaky bucket based shaping with scheduling. The problem can be approached in two ways: a) developing a new integrated shaping and scheduling mechanism [J. Rexford, F. Bonomi, A. Greenberg, and A. Wong. A Scalable Architecture for Fair Leaky-Bucket Shaping. In *INFOCOM'97*, April 1997, incorporated by reference herein] or b) leveraging existing scheduling mechanism, and extending it with leaky-bucket accounting in tandem. The apparatus 10 proposed in this document develops on the latter approach.

Figure 1:
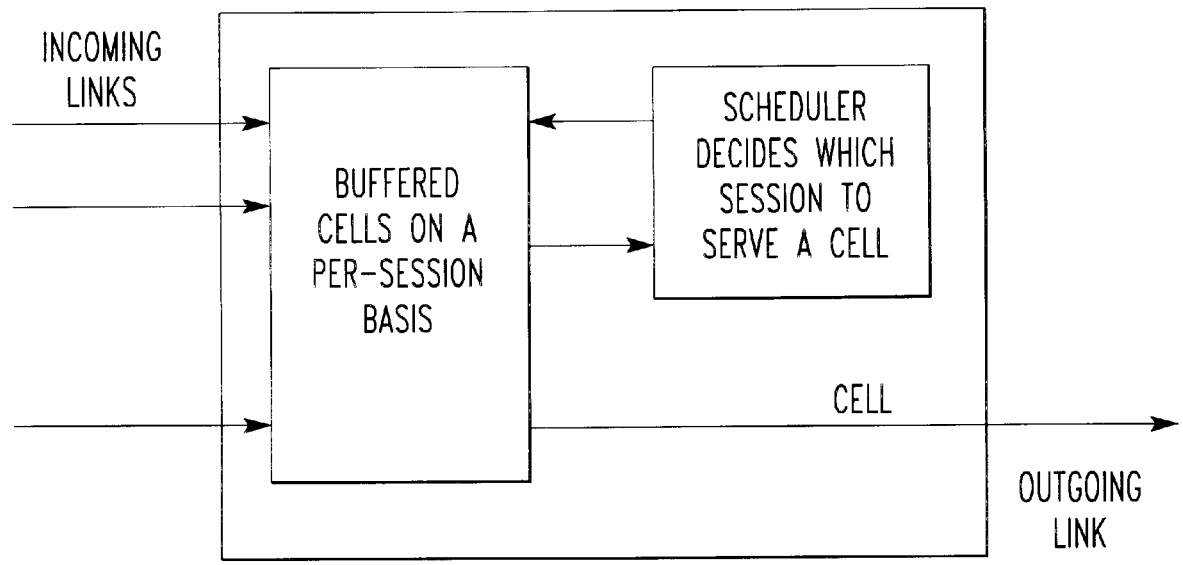
FIG. 1: A generic diagram depicting the position of a scheduler w.r.t. to outgoing link, incoming links, and buffers. The scheduler keeps track of sessions and determines which session to serve. It informs the buffer module to dispatch a cell from such session to the outgoing link.
Figure 2:
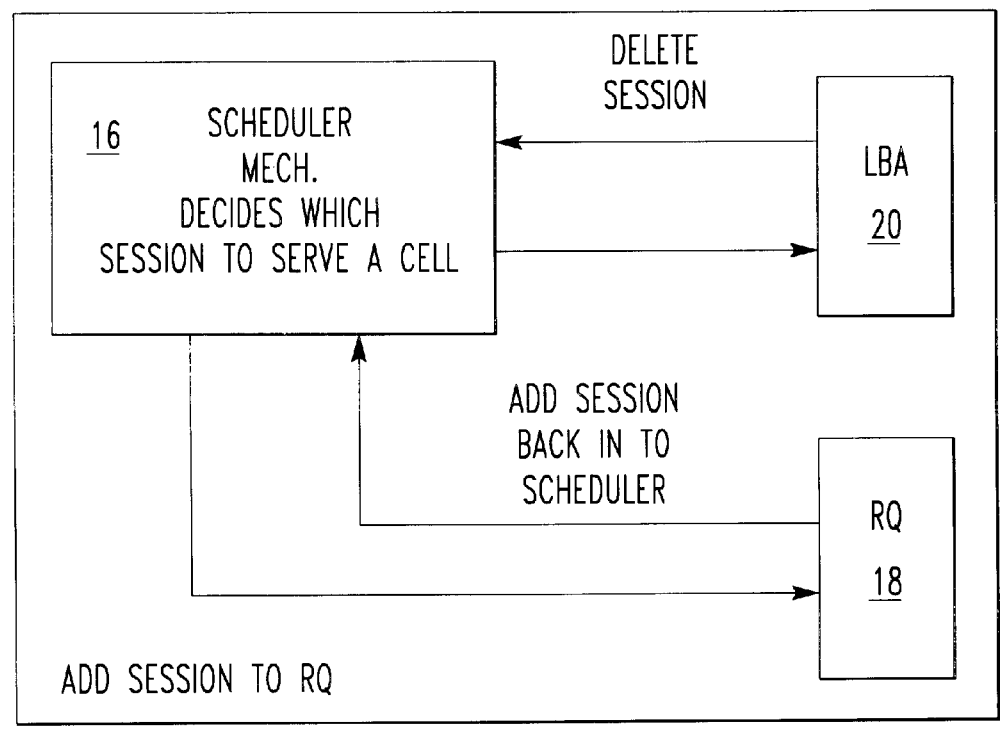
FIG. 2: Depicting the position of a leaky bucket based accounting (LBA) block along with the scheduler block to schedule/shape sessions. The scheduler informs the LBA of the session being served out in current slot time. The LBA, based on leaky bucket constraints, decides if same session was to be served out in very next slot time would it be conforming. To avoid non-conformance, it deletes the session from the scheduler. This ensures the scheduler can not serve this session in the next slot time. The LBA decides on the earliest revival time (ERT) when session can again be served in a conformant manner and inserts session in a Revival Queue (RQ).

FIG. 2 depicts a block-level diagram of the basic scheme. Along with the scheduling block, we have two more blocks: leaky bucket accounting (LBA) block and a Revival queue 18 (RQ). The following things happen: The scheduler mechanism 16 informs the LBA of the session being served out in current slot time. The LBA, based on leaky bucket constraints makes the following decision. If the same session was to be scheduled in very next slot time would the served out cell be conforming?. In case it is not, the session is deleted from the scheduler mechanism 16. This eliminates the possibility of the session being served out in the next slot time and thus being non-conforming.

The LBA decides on the earliest revival time (ERT) when session can again be served in a conformant manner and inserts session in a Revival queue 18 (RQ). Sessions from the RQ are inserted back into the scheduler mechanism 16 when current time is equal to the ERT of a session.

It can be observed that in the above scheme, there may be an arbitrary number of sessions with ERT being equal to the current slot number. Ideally all such sessions need to be put back into the scheduler mechanism 16. The above scheme works well in implementations where arbitrary number of sessions can be revived simultaneously. A problem arises if the scheduler mechanism 16 implementation/hardware limitations constrain the number of sessions that can be inserted from the RQ back into the scheduler mechanism 16 in a slot time. In such a situation, a session with immediate real-time constraints may suffer by remaining blocked behind a large number of lower real-time constraint sessions in the RQ.

The above problem can be solved in two ways:

1. Having a prioritized wakeup from the RQ. The RQ sorts sessions by those which have real-time constraints (to meet guarantees) and those which have not (best-effort). Eligible sessions with real-time constraints are revived with higher priority over non-real time sessions. Thus, this scheme offers better performance to real-time sessions. However, it can be shown that based on only the ERT it is still not possible to determine which session is most critical among all eligible real-time sessions to be revived. This leads us to investigate an alternative approach.

2. Allowing only sessions with no real time implications to be inserted in to the RQ. Guaranteed sessions are never put in the RQ. This scheme, along with the type of scheduling mechanisms to which it is applicable, is described in the next section.

Figure 3:
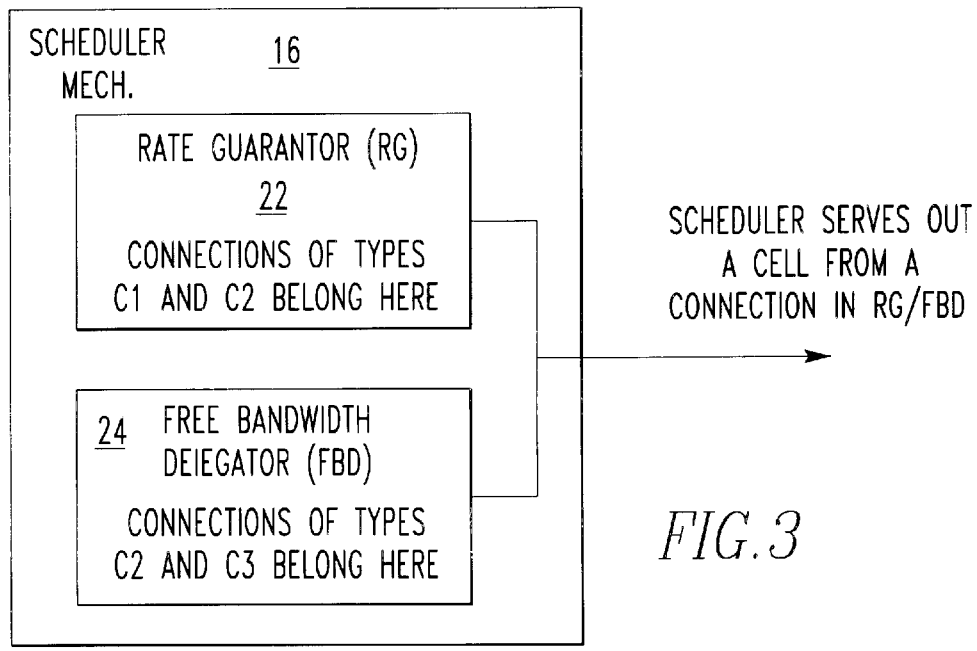
FIG. 3: Block diagram for a general scheduling scheme to which this invention is applicable. The scheduler has two parts: a) Rate Guarantor (RG) and b) Free Bandwidth Delegator (FBD). Connections can be belong to either RG, FBD, or both. The RG module, based on a Packet Fair Queuing (PFQ) algorithms offers smooth service to each connection meeting a specified guaranteed rate. The FBD, delegates the left over (free) bandwidth among its connections.

The apparatus 10 described is applicable to any ATM scheduler mechanism 16 which comprises of two parts a) Rate guarantor 22 (RG) b) Free Bandwidth Delegator 24 (FBD) as shown in FIG. 3. An ATM connection can be in one or both of these units, depending on the service type. The apparatus 10 demonstrates augmenting such ATM scheduler mechanism 16 to have leaky bucket based out-bound shaping.

In a preferred embodiment the two parts to the scheduler mechanism 16 work as follows:

Rate guarantor 22 (RG): The RG uses a variant of a PFQ scheme [J. C. R. Bennett and H. Zhang. $Wf^2q$: Worst-case fair weighted weighted fair queueing. In *INFOCOM'96*, pages 120–128, March 1996; S. Golestani. A self-clocked fair queueing scheme for broadband applications. In *INFOCOM'94*, pages 636–646, June 1994; A. Parekh. A Generalized Processor Sharing Approach to Flow Control in Integrated Services Network. PhD thesis, Massachusetts Institute of Technology, 1992, incorporated by reference herein]. Using time-stamps it serves out cells from sessions in a smooth manner with service rate being equal to the programmed rate. The smoothness is offered by serving cells from a session with regular inter-departure times with controlled variance.

Free Bandwidth Delegator 24 (FBD): This part of the scheduler mechanism 16 delegates free bandwidth. Typically, it gets a chance if the RG has no connection ready. The implementation of FBD could be based on any mechanism with consideration for priority, fairness etc.

Sessions in the scheduler mechanism 16 can be classified into three types:

1. C1: A session which is only in RG. Such sessions are for services that require guaranteed and smooth service, like CBR.

2. C2: A session belonging both in RG and FBD. These are sessions which require guaranteed bandwidth like the SCR of VBR and MCR of ABR, and therefore need to be in the RG. But, they also need more bandwidth to handle bursts, as in the case of a VBR session, or simply to receive a share of the free bandwidth, as in the case of an ABR session. Thus, these sessions need to be in FBD also.

3. C3: A session belonging only in FBD. These are sessions which only require a share of the free bandwidth, as in UBR.

Problems arise, in terms of out-bound shaping, of service received by a session of type C2 or C3 from the FBD part of the scheduler mechanism 16. Such service may not be in compliance with the terms of the traffic contract. For example, consider a session being backlogged at a particular switch with no other traffic. The scheduler mechanism 16 would schedule a succession of cells from the session till the backlog persists. The burst of cells sent out may violate the traffic contract in terms of maximum burst size and maximum rate at downstream components. Thus, there is a need for solving the above problem.

This invention describes an apparatus 10 and method to augment above scheduler mechanisms with leaky bucket based out-bound shaping for sessions of types C2 and C3.

Sessions belonging only in RG, of type C1, receive controlled smooth service. Thus, assuming their service rate in RG matches the traffic contract rate, chances of violating the traffic contract is very low.

Figure 4:
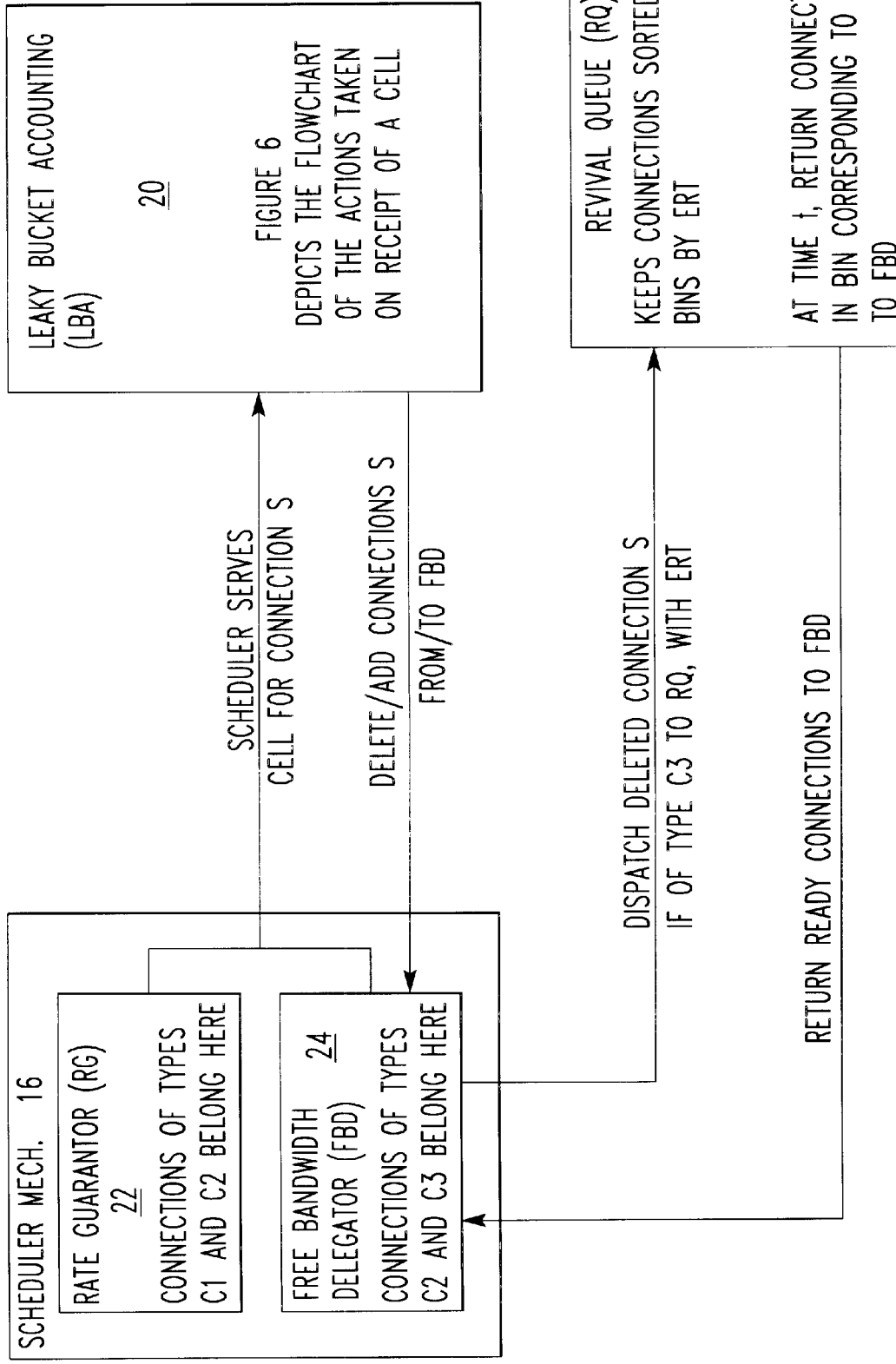
FIG. 4: Block Diagram Depicting the Apparatus. The scheduler is now augmented with two more blocks: the Leaky Bucket Accounting (LBA) and Revival Queue (RQ). The LBA maintains the leaky bucket parameters. On receipt of a cell at time $t$ it determines if the session could serve out cells in successive cell times. The decision is passed back to the scheduler, which uses it to remove/add sessions to the FBD block.

FIG. 4 depicts the block diagram of the apparatus 10. Two new logical blocks: the leaky bucket accounting (LBA) and the Revival queue 18 (RQ) have been added. The LBA is an apparatus 10 contains the per-session leaky bucket parameters and accounting logic. The RQ block is an apparatus 10 to keep track of sessions, currently deleted from the scheduler mechanism 16. The sessions in the RQ are maintained in a sorted manner. The sorting being done based on the earliest revival time (ERT) of a session.

In a given cell time, the following steps take place:
1. The combined scheduler mechanism 16 (RG+FBD) picks a session to send out a cell. Let this session be denoted as s.
2. The LBA block is notified about $s$. It then computes based on s's service history, if the session can send out another cell in the very next cell time, without violating leaky bucket based burst constraints. The scheduler mechanism 16 is then notified about this decision.
3. If the decision of LBA is that:
   Session will violate leaky bucket constraints if served out in next cycle: the session is removed from FBD. If deleted session belonging to type C2, it receives service thereon only in RG. A type C3 session, there on, receives no service and is sent to the RQ. The LBA also pre-computes an earliest revival time (ERT), based on the earliest time when the leaky bucket for $s$ can allow another cell without violating its constraints. ERT is used by RQ while storing the session.
   Session will not violate leaky bucket constraints if served out in next cycle. It is checked to see if session is already in FBD. If not there it is added back into the FBD to allow it to receive a share of free bandwidth. Note that only type C2 sessions are added back to FBD in this manner. The detail on type C3 sessions are described later in this itemization.
4. Type C3 session deleted from FBD and dispatched to RQ with the ERT value. The session is inserted into a bin corresponding to time ERT in the RQ.
5. At the beginning of each cell time, the RQ inspects the bin having sessions with minimum ERT. If minimum ERT is not greater than current time, the list of sessions in this bin are inserted back into the FBD. Assuming a similar list structure in the FBD, this actually requires a single list insertion into the FBD, and is independent of the number of sessions being added back. Otherwise, only number of sessions allowed by the hardware constraints are put back. The remaining sessions are handled in future cell times.

Figure 5:
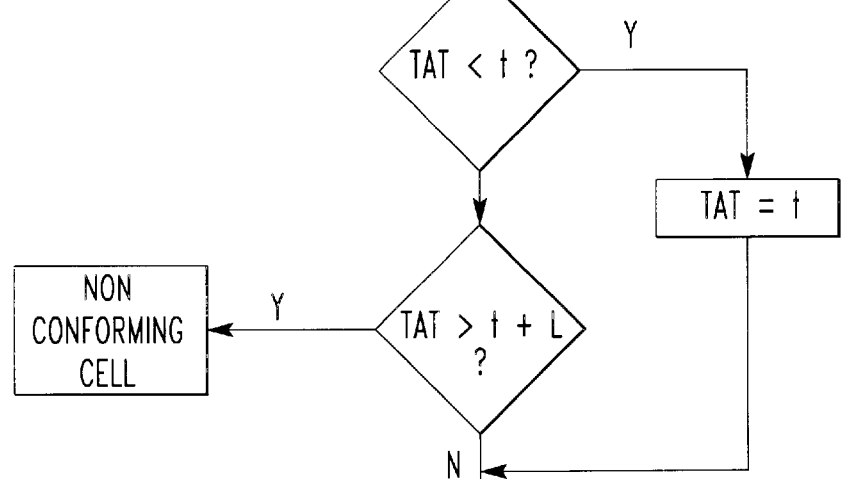
FIG. 5: Flowchart for the Virtual Scheduling Algorithm.
Figure 6:
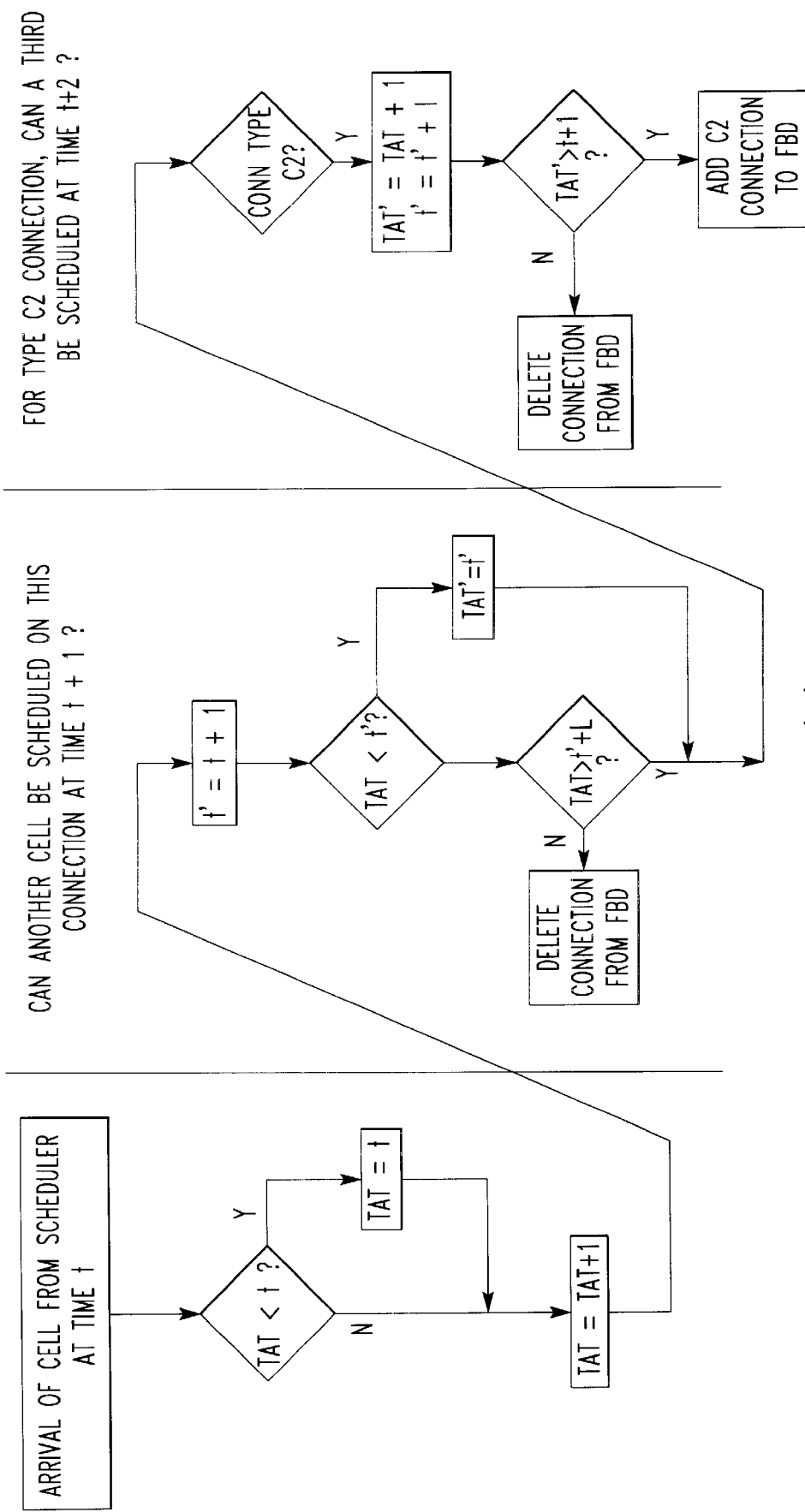
FIG. 6: Flowchart for Leaky Bucket Computations used to determine if session served out in this cycle t, should be removed/added to the FBD. The computation is depicted in three parts. Firstly, the leaky bucket parameter, TAT, is updated to have recent knowledge of bucket state. Secondly, it is checked if bucket state would allow another cell from the same session to be served out in the successive cycle t+1. If not, the scheduler is notified to remove the session from FBD, to avoid it being served out next cycle. If the bucket state allows a successive cell, and it is a session of type C2, only then we perform the last part of the computation. This is to handle the worst case, that a C2 session may receive another cell at time t+2 from the RG. If the session cannot handle this worst case, it is removed from FBD to avoid it, else it is allowed to remain/added back to the FBD (in case it was already deleted in an earlier cycle).

Each session has two sets of parameters associated with it. One or both sets may be used for a session. The proposed shaping algorithm is similar on the virtual scheduling algorithm described in the ATM Forum TM 4.0. Each set of parameters has three entries as described in Table 1, namely TAT, I, L. The actual algorithm is described in FIG. 6. Prior to discussing the details of our algorithm, we provide as reference the virtual scheduling algorithm. FIG. 5 depicts the flow chart for it.

TABLE 1

Per-session Leaky Bucket Parameters. The type of the session: C1/C2/C3 and two sets of triples (I, L, TAT) are maintained.

| | | First set of parameters | | | Second set of parameters | | |
|---|---|---|---|---|---|---|---|
| conn ID | conn type | I | L | TAT | I | L | TAT |
| 1 | C3 | | | | | | |
| 2 | C1 | | | | | | |

Figure 7:
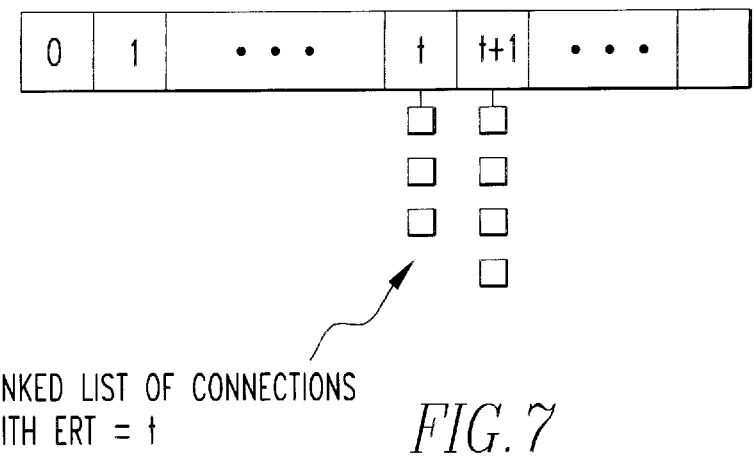
FIG. 7: A suggested implementation of the Revival Queue (RQ) Block. A session of type C3, deleted from the FBD, is inserted into the RQ in the bin corresponding to the session's Earliest Revival Time (ERT). Sessions are returned back to the FBD from RQ in the following manner. At the beginning of cycle t, the list of sessions in the bin corresponding to ERT=t are added back to the FDB.

I: Time Increment (inverse of rate being monitored)
L: Limit (Maximum tokens in bucket)
TAT: Theoretical Arrival Time of next cell The design goals for the RQ are listed below. A sample implementation based on a calendar queue is proposed as a possible embodiment. All sessions with earliest revival time (ERT) being equal to t are put into a bin corresponding to time t. Such a suggested implementation of the RQ is depicted in FIG. 7.

For a session being served out of FBD, leaky bucket accounting is performed. For any leaky bucket becoming full, the session is deleted from the FBD. A deleted session not belonging to the RG, is handled as follows. An ERT, based on when its leaky bucket can allow a cell on the session, is computed and the session inserted into the revival queue 18 (RQ) with such a time-stamp.

In a given cell time t, among the bins 26 with associated time <t, the non-empty bin with smallest time is selected and a session from it returned to the FBD. This operation is ideally performed every cell time.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A scheduling apparatus comprising:
   a server for providing service to entities;
   a mechanism for determining whether an entity that is to receive service at a future time from the server will be in conformance with a predetermined traffic criteria at the future time when the entity is to receive service from the server, the entity includes a session, the determining mechanism determines whether the session will continue to be in conformance in the future; and
   a scheduler mechanism for scheduling when entities are to receive service from the server unless the determining mechanism determines the entity will not be in conformance, the scheduler mechanism schedules the session, the determining mechanism deletes the session from the scheduler mechanism if the session in the future does not conform.

2. An apparatus as described in claim 1 including a revival queue in which the determining mechanism stores the session if it is not in conformance until a later time, which is an earliest revival time, when the session will be in conformance and can receive service from the server.

3. An apparatus as described in claim 2 wherein the determining mechanism includes a leaky bucket accounting mechanism which uses leaky bucket accounting to determine if a session is to continue receiving service from the server by being in conformance.

4. An apparatus as described in claim 3 wherein the revival queue returns the session earlier deleted from the scheduler mechanism back to the scheduler at the later time when the session will be in conformance.

5. An apparatus as described in claim 4 wherein the scheduler mechanism is a rate based scheduler.

6. An apparatus as described in claim 5 wherein the scheduler and the revival queue and the leaky bucket accounting mechanism together accomplish out-bound shaping.

7. An apparatus as described in claim 6 wherein the scheduler includes a rate guarantor which schedules a guaranteed service to sessions guaranteed service.

8. An apparatus as described in claim 7 wherein the rate base scheduler includes a free bandwidth delegator which delegates free bandwidth available for service after the rate guarantor provides service to any session guaranteed sessions.

9. An apparatus as described in claim 8 wherein the revival queue has bins in which sessions are stored corresponding to revival times, and wherein a session deleted from the free bandwidth delegator of the scheduler by the leaky bucket accounting mechanism is inserted by the leaky bucket accounting mechanism into the bin of the revival queue corresponding to the session's earliest revival time.

10. An apparatus as described in claim 9 wherein the revival queue returns sessions back to the free based delegator whose revival time equals the scheduler's cycle time t.

11. An apparatus as described in claim 10 wherein the sessions are of type C1, C2 or C3, where C1 sessions are only in the rate guarantor, C2 sessions are in both the rate guarantor and free bandwidth delegator and C3 sessions are only in the free bandwidth delegator.

12. An apparatus as described in claim 11 wherein the rate guarantor has a service rate which matches the contract traffic rate.

13. An apparatus as described in claim 12 wherein the leaky bucket accounting mechanism is connected only with the free bandwidth delegator and the revival queue is only connected with the free bandwidth delegator.

14. An apparatus as described in claim 13 wherein each session has at least one set of parameters associated with it, each set of parameters having three entries comprised of TAT, I and L.

15. A method for scheduling entities in an ATM network comprising the steps of:
receiving a session of an entity in a memory of an ATM switch connected to the ATM network;
scheduling the session for service by a server of the ATM switch;
determining with a determining mechanism whether the session will be conforming in terms of compliance to traffic contract of the ATM network in the future; and
deleting the session if the session will not be conforming in the future.

16. A method as described in claim 15 including after the deleting step there is the step of inserting the deleted session back into the scheduler at a later time when the deleted session will be conforming.

17. A method as described in claim 16 wherein before the scheduling step there is the step of serving the session with the server, and the determining step includes the step of determining whether the session will be conforming in the future so the session can continue to receive service from the server.

18. A method as described in claim 17 including after the deleting step there is the step of placing the deleted session in a revival queue.

19. A method as described in claim 18 including after the placing step there is the step of sending the session from the revival queue back to the scheduler.

20. A method as described in claim 19 wherein the receiving step includes the step of receiving the session at a free bandwidth delegator of the scheduler.

21. A method as described in claim 20 wherein the deleting step includes the step of deleting the session only from the free bandwidth delegator.

22. A method as described in claim 21 wherein the serving step includes the step of serving a cell of the session at cycle time t, and wherein the determining step includes the steps of updating a leaky bucket parameter TAT of a leaky bucket accounting mechanism of the determining mechanism to reflect the current state of the leaky bucket accounting mechanism, and checking if the leaky bucket accounting mechanism state will allow another cell of the session to be served by the server in cycle time t plus 1.

23. A method as described in claim 21 wherein the deleting step includes the step of deleting the cell if the leaky bucket accounting mechanism state will not allow the other cell to be served by the server in cycle time t plus 1.

24. A method as described in claim 22 wherein the session is of type C2 and after the checking step there are the steps of identifying that the other cell can be served by the server in cycle time t plus 1, and checking if the leaky bucket accounting mechanism state will allow a third cell of the session to be served by the server in cycle time t plus 2.

25. A scheduling apparatus comprising:
a server for providing service to entities;
a mechanism for determining whether a session of an entity that is to receive service at a future time from the server will be in conformance with a predetermined criteria at the future time when the entity is to receive service from the server; and
a scheduler mechanism for scheduling when the session of the entity is to receive service from the server unless the determining mechanism determines the session of the entity will not be in conformance, in which case the determining mechanism deletes the session from the scheduler mechanism.

* * * * *